United States Patent [19]
Pettigrew

[11] 3,762,830
[45] Oct. 2, 1973

[54] DRILL PRESS
[75] Inventor: David D. Pettigrew, Clearwater, Fla.
[73] Assignee: Rockwell Manufacturing Company, Pittsburgh, Pa.
[22] Filed: Oct. 24, 1972
[21] Appl. No.: 300,150

Related U.S. Application Data
[62] Division of Ser. No. 157,949, June 29, 1971, Pat. No. 3,718,405.

[52] U.S. Cl. ................................. 408/135, 74/842
[51] Int. Cl. ...................... B23b 47/00, B23b 47/18
[58] Field of Search ...................... 408/135; 74/422, 74/842

[56] References Cited
UNITED STATES PATENTS
3,068,723  12/1962  Pettigrew et al. ...................... 74/842

FOREIGN PATENTS OR APPLICATIONS
55,432  5/1922  Sweden ............................... 408/135

*Primary Examiner*—Francis S. Husar
*Attorney*—William A. Strauch et al.

[57] ABSTRACT

A drill press including a tool spindle mounted in a quill assembly having a toothed rack thereon which cooperates with a drive pinion to move the quill and spindle up and down. Retainer means on the upper end of the quill includes a relief notch terminating in a retainer lug which prevents the quill from inadvertently being driven downwardly past the drive pinion.

1 Claim, 7 Drawing Figures

DRILL PRESS

RELATED APPLICATION

This is a division of application Ser. No. 157,949, filed June 29, 1971 and now U.S. Pat. No. 3,718,405.

BACKGROUND OF THE INVENTION

The present invention relates to an improved variable speed pulley drive mechanism and spindle constructions adapted for mounting in the shiftable head structure of machine tools, such as drill presses and similar overarm machine tools. The variable speed pulley drive mechanisms heretofore offered for use in such machine tools have posed problems respecting (1) maintaining adequate clearance between the main support column and the pulley drive mechanisms; (2) the access to the speed control means and its locking mechanism; (3) maintaining proper belt tension on the spindle drive belt; and (4) difficulty in adjusting tension of the quill return spring safely without dismantling the machine.

SUMMARY OF THE INVENTION

The present invention in its preferred embodiment meets these respective problems by providing (1) a variable speed drive pulley mechanism wherein the variable speed pulleys are journalled respectively on a motor driven shaft and an output shaft the axes of which are fixedly supported by the head structure on diametrically opposite sides of the support column in a common plane containing the axes of the support column and the output shaft is disposed forwardly of the support column a sufficient distance to assure that the output shaft vari-pulley sheaves will clear the support column regardless of length and tensioning requirements of belt connecting jackshaft to spindle; (2) calibratable speed control mechanism fixedly supported on said head structure in laterally centered relation to the aforesaid common plane and extending forwardly from the output shaft to terminate in a manually operable speed selector means journalled in the front end wall of the head structure with adjustable friction means accessible to the operator standing in operating position at the front of the machine tool when making the speed adjustment, (3) driving the tool spindle through a speed reducing belt and pulley system that includes an input pulley fixedly secured to the output shaft carrying the output shaft vari-pulley sheaves and a drive belt tensioning pulley assembly adjustably fixed to a sidewall of the head structure, and (4) forming the upper end of this reciprocable quill member journalling the spindle with a radially directed retainer lug axially spaced from the uppermost quill rack tooth a distance sufficient to permit disengagement of and accommodate free rotation of the spring biased quill return pinion during tensioning of the return spring and designed to bindingly engage the teeth of the disengaged quill return pinion if the quill and spindle assembly is released.

It accordingly is a primary obect of the present invention to provide an improved variable speed drive pulley mechanism that is fully supported by the column supported head structure of an overarm type machine tool for free movement with the head structure and quill spindle assembly relative to the support column.

A further object of the present invention is to provide a variable speed drive pulley mechanism for mounting in the head structure of overarm type machine tools wherein the output shaft of the vari-pulley assembly comprises a jackshaft journalled in the head structure between the tool spindle drive shaft and the support column at a predetermined distance along a radius extending from the axis of the support column to assure clearance of the vari-pulley output sheaves and drive belt runs relative to the support column during shifting movement of the head structure axially and angularly relative to the support column.

Still another object of the present invention is to provide a variable speed drive pulley mechanism for mounting in the head structure of machine tools of the overarm type with speed control mechanism pivotally supported on the head structure side walls in laterally centered relation to a common plane containing the axis of the support column and the axes of the input vari-speed pulley and the output varispeed pulley disposed on diametrically opposite sides of the support column and provided with speed selector means, including adjustable locking means, journalled in the head structure front end wall where it and its adjustable locking means will be readily accessible to an operator standing in operating position at the front of the machine tool.

A further object of the present invention resides in the provision of a simple, rugged speed control mechanism for the variable speed drive pulley mechanism of the primary object composed of a lever means pivotally connected between its ends to the opposed side walls of the head structure and provided at one end with adjustable connection means including a shifter ring journal connected to the movable sheave of the output vari-speed pulley and provided at the opposite end with a cam follower and speed selector means journalled in the front wall of the head structure and including an eccentric cam abuttingly engaging the cam follower of the lever means and adjustable friction look means including a clamp screw threaded into an axially directed through passage in the speed selector and accessible through the exposed passage end for operation by an operator standing in operating position at the front of the machine tool.

A further object of the present invention resides in providing a simple, rugged high speed limit stop for the speed control mechanism of the preceding object composed of a headed bolt adjustably threaded into the head structure top wall interiorly thereof in position to abuttingly engage the cam follower of the lever means opposite the point of engagement with the eccentric cam.

Still another object of the present invention resides in providing a variable drive pulley mechanism for mounting in the head structure of overarm type machine tools composed of a variable speed pulley drive mechanism drivingly connecting a motor and jackshaft mounted in the head structure bottom wall on diametrically opposite sides of a through passage provided to receive a head support column, a fixed speed reduction pulley drive mechanism drivingly connecting the jackshaft and a spindle drive pulley fixed to a spindle shaft journalled in the head structure containing wall with its axis in a plane containing the axes of said jackshaft and the through passage, and speed control lever means pivotally supported by the opposite head structure sidewalls with one end straddling and adjustably connected to the movable sheave of the jackshaft vari-speed pulley through a shifter ring provided with diametrically opposed, angularly adjustable, connector lugs pin and slot connected to the one end of the speed control lever means.

Another object of the present invention is to provide the rack toothed spindle support quill of an overarm type machine tool including a head structure mounting the spindle drive mechanism and a spring biased quill return pinion with a radially directed retainer lug axially spaced from the uppermost rack tooth a distance sufficient to receive the quill return pinion for free rotation upon disengaging the rack and pinion to tension the biasing spring and adapted to bindingly engage the quill return pinion and support the quill and spindle assembly in event the quill and spindle is released without reengaging the rack and pinion.

BRIEF DESCRIPTION OF THE DRAWINGS

Further objects of the invention will appear from the following descriptions and appended claims when read in conjunction with the accompanying drawings wherein:

DESCRIPTION OF PREFERRED EMBODIMENT

Figure 1:
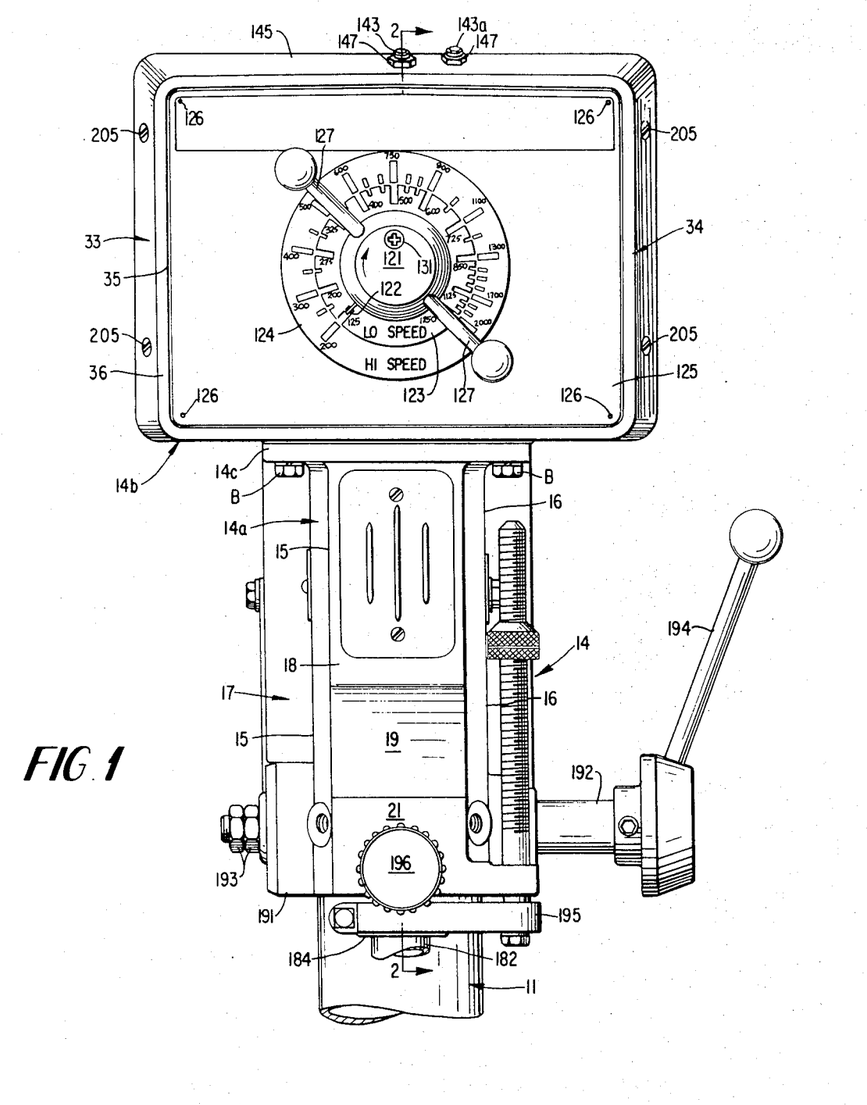
FIG. 1 is a front elevational view of the head structure of an overarm type drill press supported on the upper end of a conventionally constructed support column, a portion of which is shown protruding from the lower wall of the head structure.
Figure 3:
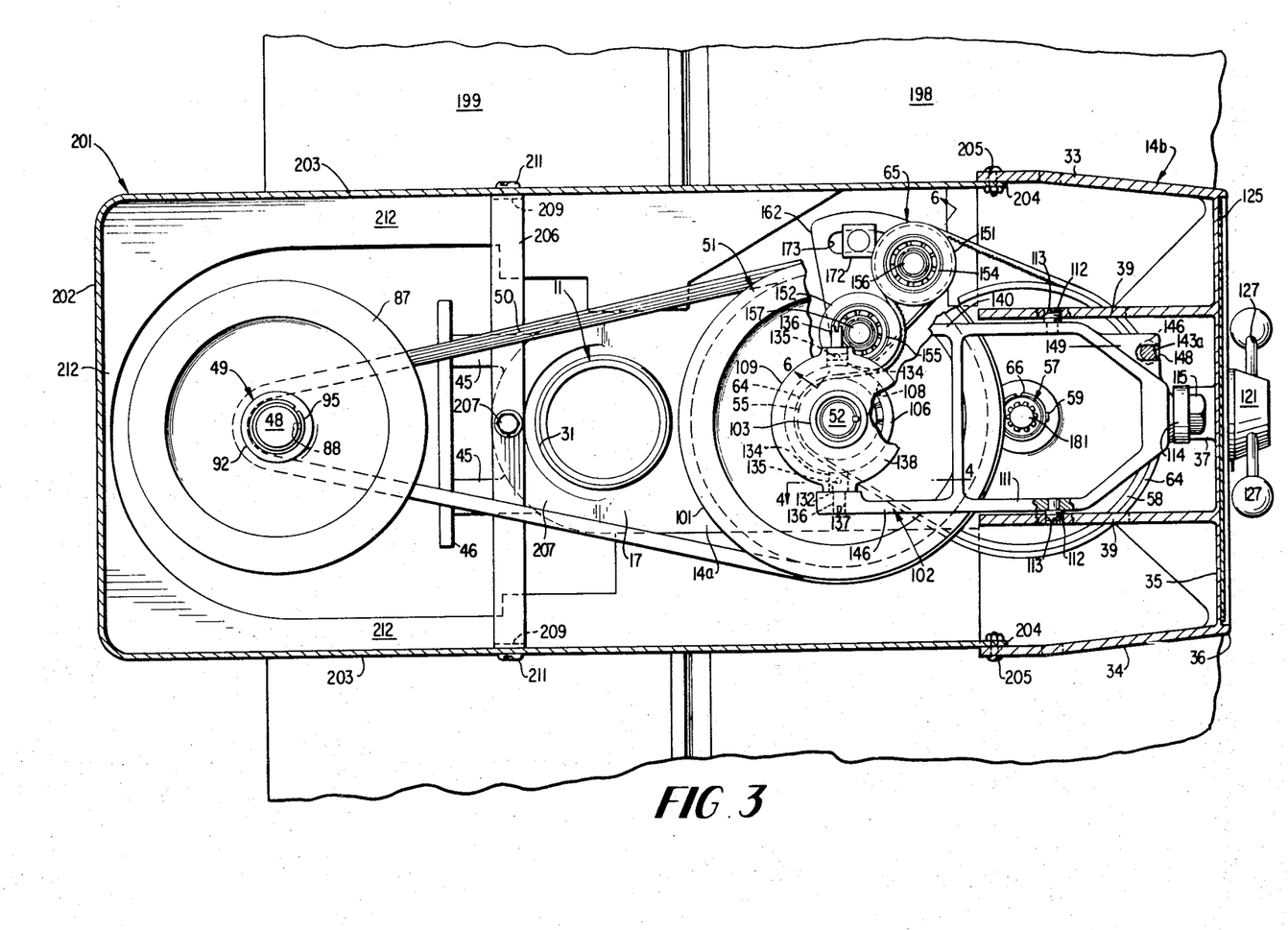
FIG. 3 is a horizontal sectional view taken substantially on line 3—3 of FIG. 2 looking in the direction of the arrows.

With continued reference to the drawings wherein like reference numerals are employed throughout the several figures to indicate the same parts, the present invention is illustrated in connection with an overarm machine tool 10 shown as a drill press having an upstanding support column 11 conventionally fixedly mounted at its lower end to a pedestal base 12 and slidably mounting in vertically spaced relation a work support table 13 and head structure 14 (FIGS. 1 and 3). Since the pedestal base, work support table and their association with support column 11 may assume the conventional form of any type of overarm machine tool, for example drill presses of various shapes and forms, including floor and bench mounted drill presses, ram type drill presses, gang mounted drill presses, and vertical spindle milling machines, no further illustration and description of these basic structures will be provided at this point. In all overarm machine tools of the type mentioned, the head structure 14 is suitably constructed to pully mechanism, the tool spindle drive pulley and drive shaft assembly, the speed control mechanism and associated speed selector, and the head structure clamp means provided to permit axial and angular adjustment of the head structure relative to the work support table and support base.

Figure 2:
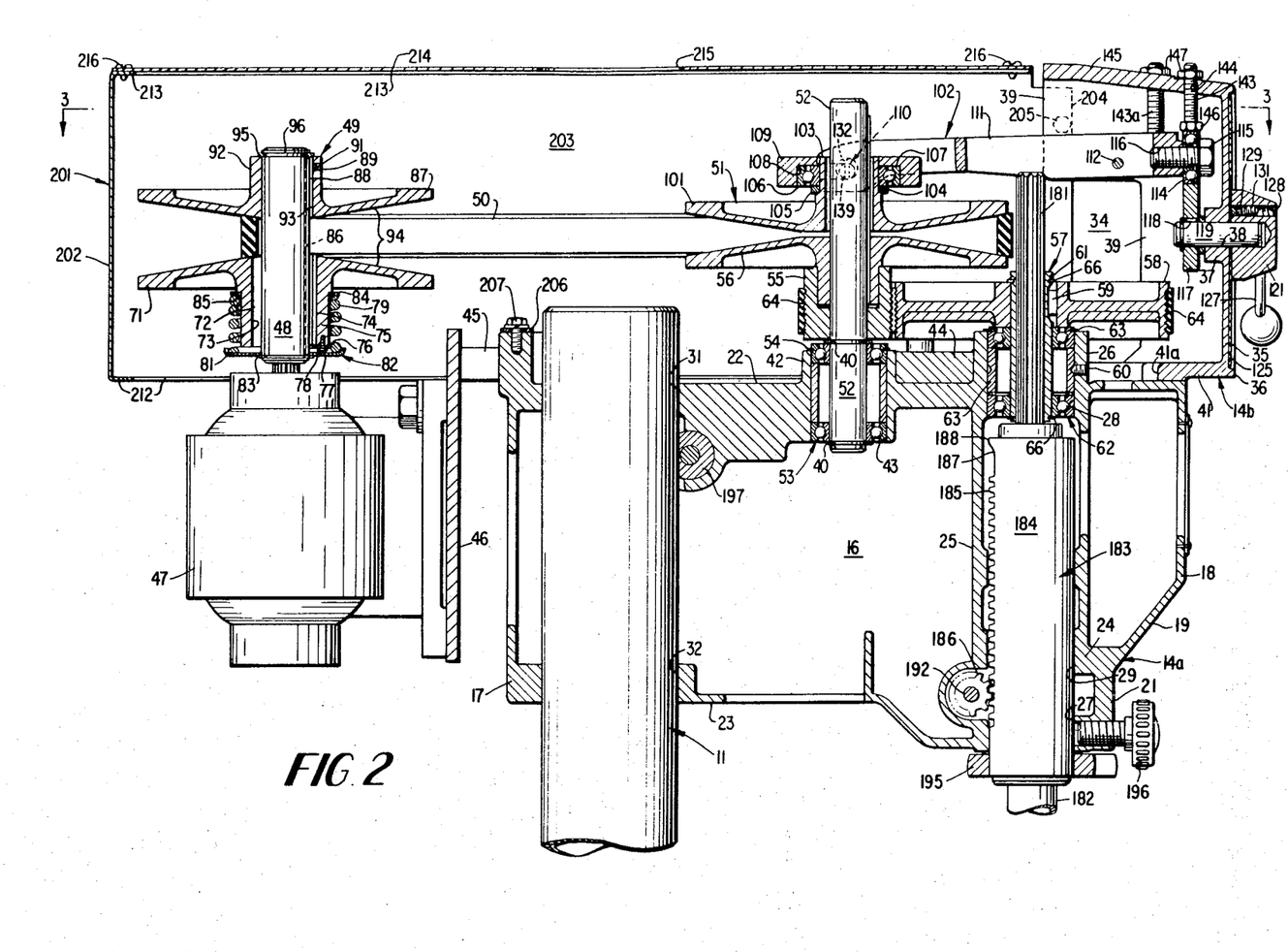
FIG. 2 is a vertical sectional view taken substantially on line 2—2 of FIG. 1 looking in the direction of the arrows.

Referring for the moment to FIGS. 1 through 3, the head structure 14 here illustrated is shown in its uppermost position at the upper end of support column 12. Head structure 14 includes an elongated main body casting 14a (FIG. 1) and a transversely directed, shallow dish-shaped body casting 14b (FIGS. 1, 2 and 3) bolted together along a parting line, defined by the top front surface of main body casting 14a, through the instrumentality of laterally directed ears 14c formed on main body casting 14a and bolt and lock washer assemblies B. Body casting 14a is of generally rectangular configuration the side walls 15 and 16 of which intersect at their rear ends (left ends as seen in FIGS. 2 and 3) in a laterally directed rear wall and intersect at their front ends a laterally directed, front wall 18, including a downwardly inclined wall panel 19 the lower end of which merges into a generally cylindrical, dependent boss 21. Side walls 15 and 16 at their upper and lower edges are respectively interconnected by right angularly related top and bottom walls 22 and 23 (FIG. 2). As best seen in FIG. 2 bottom wall 23 at its forward end slopes downwardly and merges into boss 21 below a horizontal partition wall 24 supporting a hollow vertical column 25 extending upwardly to and continuing upwardly beyond top wall 22 to define an upstanding annular boss 26 protruding above top wall 22. Bosses 21 and 26 and partition wall 24 are co-axially related to column 25 and are formed with respective vertically aligned through passages 27, 28 and 29. The top and bottom walls 22 and 23 are formed in coaxial relation to hollow cylindrical body section 17 with respective through pasages 31 and 32 dimensioned to closely encompass the periphery of column 11 and slidingly and rotatably associate head structure 14 with column 11. A vertical plane containing the common axis of through passages 27, 28 and 29 on the one hand and the common axis of through passages 31 and 32 on the other hand longitudinally bisects elongated main body casting 14a and transversely bisects dish-shaped body casting 14b as will be clear from an inspection of FIG. 3. It follows, therefore, that side walls 15 and 16 of head structure body section 14a and the side walls 33 and 34 of body section 14b are transversely symmetrically related to the axis of support column 11 and the axis of upstanding boss 26.

Referring to FIGS. 1 and 2, the front wall 35 of head structure body section 14b is inset within a peripherally extending flange 36 and is provided with a rearwardly directed cylindrical boss 37 the axis of which lies in the aforesaid bisecting plane. Boss 37 is provided with a through bore 38 (FIG. 2) extending forwardly through front wall 35 for a purpose to be presently described. Head structure body section 14b at equi-laterally spaced points at opposite sides of through bore 38 is provided along front wall 35 and the top wall with vertically extending inwardly directed ribs 39 (FIGS. 2 and 3) and the bottom wall 41 thereof is formed between ribs 39 with rearwardly opening notch 41a (FIG. 2) dimensioned to partially encompass boss 26.

Top wall 22 of head structure main body section 14a midway between side walls 15 and 16 is provided with a through apertured cylindrical boss 42 and axis of which lies in the aforesaid bisecting plane with its opposite ends protruding beyond the upper and lower faces of top wall 22 to form an elongated vertical passage 43. An upstanding reinforcing rib 44 is formed on top wall 22 extending between bosses 26 and 42 to rigidify top wall 22 between bosses 26 and 42 and at its rear end with respective tapped mounting bosses 45 (FIGS. 2 and 3) projecting rearwardly from cylindrical body section 17 in opposed centered relation to the aforesaid plane to provide mountings for removably supporting a motor mounting plate 46 carrying a drive motor 47. As clearly appears from FIG. 2, the rotor shaft of motor 47 is parallel to the axes of column 11 and boss 42 and its through passage 43 and is conventionally keyed to drivingly cooperate with and support the sleeve shaft 48 of a vari-speed drive pulley assembly 49. Vari-speed drive pulley assembly 49 is connected through V-belt 50 with a driven vari-speed pulley assembly 51 drivingly keyed to a jackshaft 52 journalled in passage 43 of boss 42 by clampingly securing jackshaft 52 through snap rings 40 to the inner races of a bearing assembly 53 disposed in passage 43 and secured against axial downward movement relative to boss 42 by snap ring 54.

As will appear from a consideration of FIG. 2, driven vari-speed pulley assembly 51 includes an annularly grooved pulley 55 having a drive fit or other fixed connection to the hub of fixed sheave 56 of driven varispeed pulley assembly 51 and serving as the input pulley of a speed reduction pulley system 57 including a pulley 58 journalled in the passage 28 of boss 26. Speed reduction pulley system 57, in addition to input pulley 55, includes an enlarged, annularly grooved, spindle drive pulley 58 the hub of which is keyed at 59 to a spindle drive sleeve 61 journalled in passage 28 of boss 26 through a bearing assembly 62 secured against axial movement relative to boss 26 by spacer ring 63 disposed between the upper and lower bearings of assembly 62 and fixed in bore 28 by a set screw 60, a multi-ribbed drive belt 64, and a belt tension pulley assembly 65 (FIG. 3). As best shown in FIG. 2, spindle drive sleeve 61 is secured against relative axial movement in the hub of spindle drive pulley 58 and the inner races of the spaced bearing assembly 62 by means of respective snap rings 66 seated in annular grooves in the opposite ends of spindle drive sleeve 61 in abutting engagement with the upper hub end of spindle drive pulley 58 and the lower inner bearing race of bearing assembly 62.

The shiftable sheave 71 of vari-speed drive pulley assembly 49 is slidably supported on sleeve shaft 48 through an antifriction sleeve 72 conventionally bonded to the hub through bore 73 and a key 74 fixed to hub 75 by an anchor plate 76 removably secured to the lower end of hub 75 by securing screws 77. As best shown in FIG. 2, key 74 is cross-slotted at 78 near its lower end to receive the inner end of anchor plate 76 and the lower end of hub 75 is reduced in diameter to receive coil compression spring 79 the lower end of which is disposed in end abutted relation to the radial wall 81 of a dish-shaped retainer ring 82 secured to the lower end of sleeve shaft 48 by a snap ring 83. The upper end of compression spring 79 abuts a wear ring 84 interposed between the upper spring end and the axial shoulder 85 formed by the inner end of the reduced diameter hub portion. Key 74 is of lesser length than the hub of sheave 71 and slidably supported in an axially directed keyway 86 extending from end to end of sleeve shaft 48. The fixed sheave 87 of vari-speed drive pulley assembly 49 is keyed to the upper end of sleeve shaft 48 by a key 88 fixedly secured in the upper end of keyway 86 by a set screw 89 threaded into a radial tapped passage 91 formed in the hub 92 of sheave 87 in laterally centered relation to an axially directed keyway 93 formed in the hub bore of sheave 87 and terminating short of the conical face 94 of sheave 87. A snap ring retainer 95 received in a ring groove 96 adjacent the upper end of sleeve shaft 48 is provided to fix sheave 87 and key 88 against outward movement relative to the upper end of sleeve shaft 48 should set screw 89 loosen during operation.

V-belt 50 has its opposite side faces angled to matingly engage the opposed conical faces 94 of moveable sheave 71 and fixed sheave 87 and, due to the keyway and key arrangement just described, is free to drivingly engage the sheaves throughout the full radial extent of the conical faces 94 delimited by the diameter of sleeve shaft 48 and the peripheries of sheaves 71 and 87 since neither of the keys 74 and 88 protrude through the conical sheave faces 94. Full driving engagement in all radial positions of drive belt 50 with sheave faces 94 is assured since biasing spring 79 is effective at all times to force sheave 71 toward sheave 87 maintaining retainer ring 82 and fixed sheave hub 92 in firm end bearing engagement with snap rings 83 and 95.

Selected speed variations are obtained by shifting the upper moveable sheave 101 of the driven vari-speed pulley assembly 51 axially relative to jackshaft 52 and fixed sheave 56 which, due to its fixed path of rotation maintained by the bearing assembly 53, determines the tracking path of V-belt 50. To this end, the present invention provides a novel speed control mechanism 102 which at all times exerts a downward thrust force on the driven pulley sheaves in a manner to pre-load the jackshaft journal bearing assembly 53. This is accomplished by providing the shiftable pulley sheave 101 with an upwardly directed, reduced diameter hub portion 103 defining at its inner end an axially upwardly facing shoulder 104 supporting a thrust washer 105 disposed in end bearing supporting relation to the inner race of a shifter bearing 106 the outer race 107 of which is received in a downwardly opening, annular recess 108 formed in a shifter ring 109 having an adjustable pin and slot connection 110 to one end of a generally rectangular, frame-like shifter lever 111. The shifter lever 111 is pivotally supported inwardly from its opposite end on a rod 112 fitting through holes drilled in lever 111 and in the opposed ribs 39 of head structure body section 14b and the opposite end is provided with a cam follower roller bearing 114 the inner race of which is clamped to the end face of shifter lever 111 by a headed clamp screw 115 threaded into end opening tapped passage 116. The outer race of cam follower roller bearing 114 peripherally abuttingly cooperates with the peripheral wall of an eccentric cam 117 keyed at 118 to the inner protruding end of a speed selector cam shaft 119 rotatably mounted in through bore 38 of front wall 35 of head structure body section 14b with its opposite end protruding forwardly through front wall 35 to fixedly receive cam shaft operating knob 121. Operating knob 121 as best seen from FIG. 1, includes a radially protruding dial pointer 122, cooperating with a low speed dial scale 123 and a high speed dial scale 124 imprinted on a rectangular plate 125 pinned at its four corners to front wall 35 by pin rivets 126, and diametrically opposed lever arms 127. Arms 127 provide a leverage advantage assuring easy operation of the speed selector cam 117 and shifter lever 111 when a speed change is being effected. Knob 121 in radially offset relation to its rotational axis is provided with an axial through tapped passage 128 (FIG. 2) the inner open end of which freely receives a friction block 129 the exposed end of which grippingly cooperates with the opposing face of plate 125 when set screw 131 is threaded home into passage 128 to frictionally hold knob 121, shaft 119 and speed selector cam 117 in any selected speed setting of shifter lever 111. Set screw 131 is readily accessible through the outer end of passage 128 to an operator standing in normal operating position in front of the drill press for adjusting and reestablishing engagement of friction block 129 periodically when compensation for wear of block 129 is required.

Figure 4:
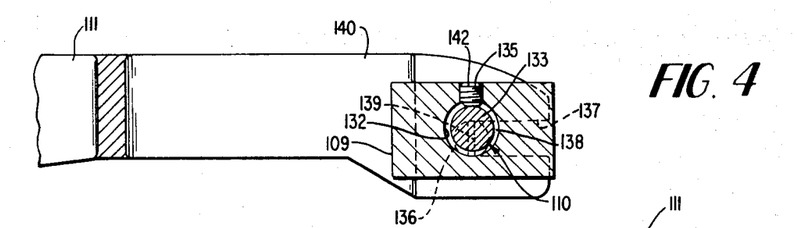
FIG. 4 is a vertical sectional view through one of the shifter ring connector lugs taken on line 4—4 of FIG. 3 looking in the direction of the arrows.

Referring for the moment to FIGS. 3 and 4, the pin and slot connection 110 between shifter ring 109 and shifter lever 111 is provided by radially directed, blind journal bores 132 formed in ring 109 at diametrically opposed points (FIG. 3) intersected between their respective connector pins 133 having enlarged cylindrical heads 134 journalled in bores 132 with their reduced diameter eccentrically related cylindrical shanks 136 projecting outwardly from ring 109 into open ended, through slots 137 formed in the offset free terminal ends of shifter lever arms 140. Heads 134 of connector pins 133 are each provided with an annular groove 138 midway between its ends to receive the tapered shank end of a respective set screw 142 threadedly associated with each tapped passage 135. Set screws 142 when threaded home into their respective grooves 138 lock connector pins 133 in any selected angular position relative to journal bores 132 and when backed off slightly to relieve the locking pressure, permit rotation of connector pins 133 around the axis of heads 134 to swing eccentric shanks 136 along an arcuate path having the axes of heads 134 as a center to raise and lower shanks 136 and the free end of shifter lever 111 relative to the axes of heads 134. To permit ready rotation of connector pins 133, the exposed shank end of each pin is formed with diametrical cross-slot 139 dimensioned to receive the blade of a conventional screwdriver (now shown) employed to make the desired adjustment. This adjustment is a calibrating adjustment provided primarily to enable the shifter lever 111 to be factory adjusted.

The vari-speed drive of this invention permits the same basic drill assembly to be marketed for either of two end usages dependent upon the spindle speeds required to efficiently meet the user's need by selecting either of two standard driven pulley assemblies 51. It will be appreciated that the invention has the capability of permitting the marketing of a drill press with both driven pulley assemblies 51 for differing end uses so the user can make the speed range choice himself to selectively condition the drill press for either speed range usage.

It will be further appreciated that appropriate selection of motors 47 of different output speed will permit still further speed ranges to be obtained using the same basic vari-speed pulley drive.

To assure against overrunning the limit positions of the shiftable sheaves in either speed range, the eccentric rim of speed selector cam 117 between its shortest and longest radius being sufficiently longer than necessary for either range adjustment, the present invention provides a low speed limit stop in the form of a headed bolt 143 (FIGS. 1 and 2). Bolt 143 is threaded upwardly into a suitably tapped through passage 144 formed in the top wall 145 of head structure section 14b with its axis in the bisecting vertical plane defined by the common axis of passages 27, 28 and 29 and the common axis of passages 31 and 32 heretofore described so bolt head 146 intercepts the eccentric rim of speed selector cam 117 at its predetermined low limit position to arrest further clockwise movement of cam 117 and knob 121 as shown by the arrow in FIG. 1. A lock nut 147 threaded on the upper protruding shank end of bolt 143 locks stop bolt 143 in either of its adjusted low limit positions. A similar headed stop bolt 143a of greater length than bolt 143 is threaded through a similar tapped through passage in top wall 145 offset rearwardly and to the right of passage 144 to provide a high speed limit stop. The upper protruding shank end bolt 143a is provided with a similar lock nut 147 (FIGS. 1 and 2) while the lower shank end passes downwardly through a slot 148 formed in a web-like stop flange 149 formed on shifter lever 111 to dispose the nut head 146 beneath stop flange 149 in position to abut flange 149 and arrest clockwise pivotal movement of shifter lever 111 at either of its adjusted high speed limit positions. The friction block 129 also is intended to counteract the upward biasing forces of belt 50 and spring backed shiftable sheave 71. The primary purpose of these stops is safety-to prevent overspeeding, damage to belts from hitting shafts, jamming of the mechanism and backup safety in case of friction block failure. Such clockwise pivotal movement of shifter lever 111 is effected by the upward biasing force of belt 50 and spring backed shiftable sheave 71 exerted through shifter ring 109 and connector pins 133 at all times that belt 50 is entrained around varispeed pulleys 49 and 51.

It will be appreciated from the preceding description that the present invention provides a simple and highly effective vari-speed pulley speed control mechanism 102 for incorporation in the shiftable head structures of overarm type machine tools that may be effectively operated by an operator from a normal operating position in front of the tool. Additionally it provides a speed control mechanism providing speed range adjustments that may be readily effected to properly coordinate the vari-speed pulley transmission to the motor speed and the speed selector knob so that accurate spindle speed selections can be initially established upon attachment of a selected motor.

Figure 6:
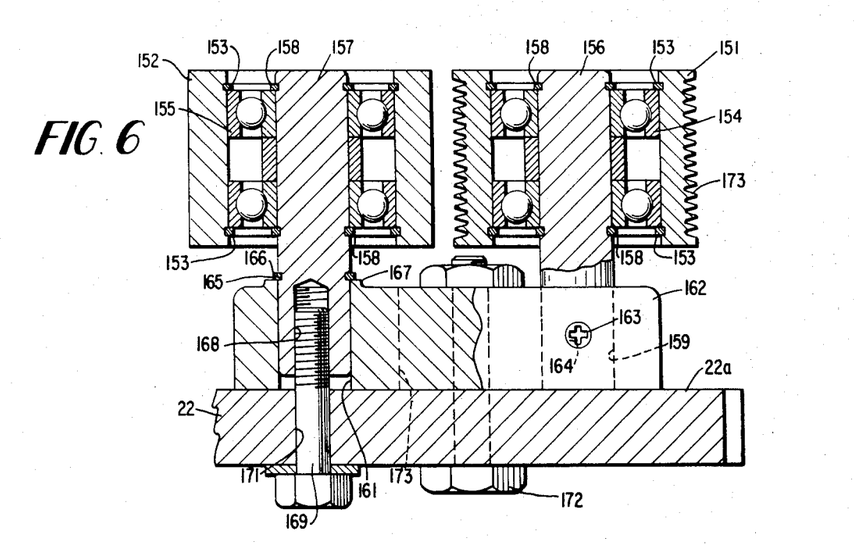
FIG. 6 is a vertical sectional view taken on line 6—6 of FIG. 3.

While any suitable belt tension pulley assembly 65 may be employed to tension drive belt 64 of the speed reduction pulley system 57, the present invention contemplates a pair of adjacently related pulleys 151 and 152 supported by snap rings 153 abutting the opposite ends of the outer bearing races of respective roller bearings 154 and 155 the inner races of which are fixed against relative axial movement to the upper ends of respective journal shafts 156 and 157 (FIG. 6) by snap rings 158. Journal shafts 156 and 157 are respectively supported in upstanding relation by insertion of their lower ends in respective through passages 159 and 161 formed in adjacently related corners of a triangular mounting plate 162. A set screw 163 threaded into a tapped passage 164 intersecting passage 159 fixedly secures journal shaft 156 in passage 159 while a snap ring 165 seated in ring groove 166 formed in shaft 157 and disposed with its lower side face abuttingly engaging the end face of an upstanding annular boss 167 surrounding the upper end of passage 161 supports shaft 157 in passage 161. As clearly shown in FIG. 6, the lower end of shaft 157 is provided with a coaxial, tapped, blind bore 168 and terminates inwardly of the lower end of passage 161. Mounting plate 162 is pivotally supported for angular adjusting movement around the axis of shaft 157 by means of a pivot bolt 169 the shank of which passes upwardly through a passage 171 in a flange 22a formed as an integral side extension of top wall 22 of head structure 14a and a clamp bolt and nut assembly 172 carried by flange 22a and cooperating with an arcuate slot 173 formed in plate 162 with the axis of shaft 157 as a center. Pulley 151 is annularly grooved as shown at 173 to entrain the grooved face of drive belt 64 while the peripheral wall of pulley 152 has a plain surface adapted to rollingly cooperate with the outer smooth face of belt 64. End play in belt 64 is readily eliminated by the belt tension pulley assembly 65 by loosening clamp bolt and nut assembly 172 and shifting mounting plate 162 clockwise as viewed in FIG. 3 to establish the desired tension in drive belt 64.

Referring for the moment to FIG. 2, spindle drive sleeve 61 is internally splined to axially slidingly receive the splined upper end 181 of a conventional tool drive spindle 182 journalled conventionally in a quill assembly 183 the quill sleeve 184 of which is formed along one side with feed rack teeth 184 adapted to mesh in conventional manner with the feed drive pinion 186. The upper end of quill sleeve 184 is undercut at 187 below the root diameter of the feed rack teeth 185 over a distance sufficient to freely pass the teeth of pinion 186 when the quill assembly 183 is lowered beyond its lowermost operating position and the upper end of the undercut 187 merges radially outwardly into a radially directed stop lug 188. Lug 188 and the merging portion of quill sleeve 184 immediately below lug 188 are suitably dimensioned to bindingly engage the teeth of pinion 186 when quill assembly 183 is lowered sufficiently to disengage the rack teeth 185 to arrest downward movement of quill assembly 183 upon disengagement of pinion 186 and the rack teeth 185. As a consequence, accidental removal of the quill assembly 183 is effectively prevented by lug 188 in event feed movement of pinion 186 is continued beyond its designed movement.

In addition to this automatic arrestment of the quill assembly 183, the undercut 187 frees pinion 186 for winding of the conventionally provided quill return spring (not shown) housed in the conventional winding cup 191 shown at the left end of the feed shaft 192 in FIG. 1. Winding is effected by lowering quill assembly 183 to bring undercut 187 opposite pinion 186 and manually grasping the downwardly protruding portion of quill sleeve 184 to hold the quill assembly 183 with pinion 186 registering with undercut 187 during the winding operation. When winding is completed, the quill is raised to engage the pinion with the feed rack teeth, thus avoiding the necessity of adjusting the winding cup or disturbing the locknuts. The usual hand lever 194 is provided to impart feeding movement to quill assembly 183 and the usual depth of cut stop mechanism 195 and quill locking knob and screw assembly 196 is provided to complete the control mechanism usually found on such drill presses. Conventional friction locking means 197 is provided for securing head structure 14 in selected position along column 11 above a work support table 198 and the subjacent support base 199 (FIG. 3) which supports column 11.

The vari-speed drive is suitably enclosed in a light metal or plastic guard or housing composed of a shell-like casing 201 having rear end wall 202, respective side walls 203 terminating at their front ends in a mounting lip 204 bolted at vertically spaced points to head section side walls 34 by nut and bolt assemblies 205 and supported inwardly at its rear end by a cross bar or strap 206 fixed midway of its opposite ends to the upper end of an upstanding arcuate flange 207 formed on body section 17 by a cap screw 208. The opposite ends of strap 206 are down-turned at 209 (FIG. 3) and bolted to side walls 203 by self-threading screws 211 threaded into strap ends 209.

Preferably shell-like casing 201 is provided with inturned flanges 212 and 213 along its lower and upper rear ends and sides to rigidify the rear and side walls and define an open top and bottom. The side walls 203 are spaced apart sufficiently to assure that the inturned flanges will clear the head section 14a so casing 201 may be readily removed when necessary to secure access to the vari-speed drive and the interior of head section 14b and the structure housed therein. A dust cover 214 having a through passage 215 can be secured at its four corners to the upper inturned flanges 213 by self-threading screws 216 to maintain passage 215 in registering alignment with column 11 which freely passes through passage 215 upon lowering movement of head structure 14 along column 11.

ALTERNATE SHIFTER LEVER

Figure 7:
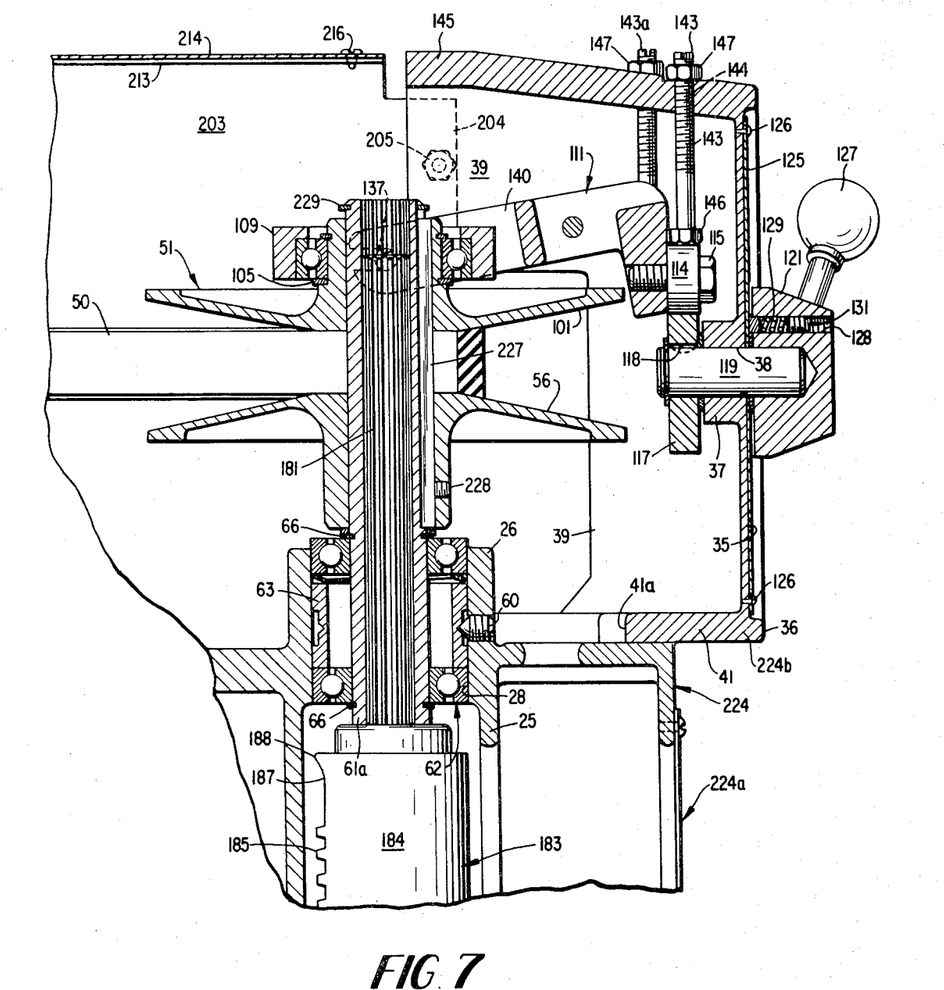
FIG. 7 is a fragmental vertical sectional view of a drill press fitted with the speed control lever means of FIG. 4.

The speed control mechanism 102 of the preferred embodiment may also be employed in overarm machine tools which omit the jackshaft 62 and mount the vari-speed pulley drive output pulley 51 directly on the tool spindle drive sleeve. An example of such an alternate usage is shown in FIG. 7. This view illustrates the upper end of the quill and tool drive spindle assembly of a conventional ram type drill press. In such a machine tool, the head structure 224 comprises a main body casting 224a the forward end of which is substantially like that of head section 14a, and a dish-shaped body casting 224b identical in construction to that of body casting 14b as will be apparent from the use of identical reference numerals in FIG. 7. The top wall 22a and bottom wall 23a of casting 224a at the forward end merge respectively into a hollow vertical column 225 corresponding to column 25 extending upwardly beyond top wall 224a to define an upstanding annular boss 26 while bottom wall 23a slopes downwardly and merges into boss 21 below horizontal partition wall 24. Coaxially related bosses 21 and 26 and partition wall 24 are formed with respective through bores 27 and 29 as in the preferred embodiment. A quill assembly 183 is conventionally mounted in through bores 27, 28 and 29 and journals in conventional manner a tool drive spindle 182 the upper splined end 181 of which extends upwardly through a spindle drive sleeve 61a journalled in through bore 28 through bearing assembly 62 in the manner heretofore described. Comparing spindle drive sleeves 61a and 61, it will be seen that the upper end of 61a above bearing assembly 62 is somewhat longer than the corresponding end of sleeve 61 to accommodate the greater hub length and the axial movement of the shiftable sheave of the driven vari-speed drive pulley assembly 51 which is directly drivingly keyed to spindle drive sleeve 61a by an elongated key 227 fixedly secured to the hub of fixed sheave 56 and sleeve 61a by means of a set screw 228. This set screw 228 positively locks key 227 and fixed sheave 56 to spindle drive sleeve 61a leaving shiftable sheave 101 freely axially shiftable relative to spindle drive sleeve 61a toward and away from fixed sheave 56 to effect a speed setting within the speed range determined by the limits of movement permitted by speed control mechanism 102. The uppermost end of spindle drive sleeve 61a is annularly grooved and fitted with a snap ring 229 spaced axially from the upper end of key 227 and the upper end of the hub of shiftable sheave 101 to prevent disassociation of key 227 if set screw 228 should loosen in use. Snap ring 229 will also prevent accidental disassociation of shiftable sheave 101 under the biasing force exerted through drive belt 50 by the spring biased shiftable sheave 71 of the driving vari-speed pulley assembly 49 when the connector pins 136 are disengaged from the slot 137 of shifter lever 111.

Figure 5:
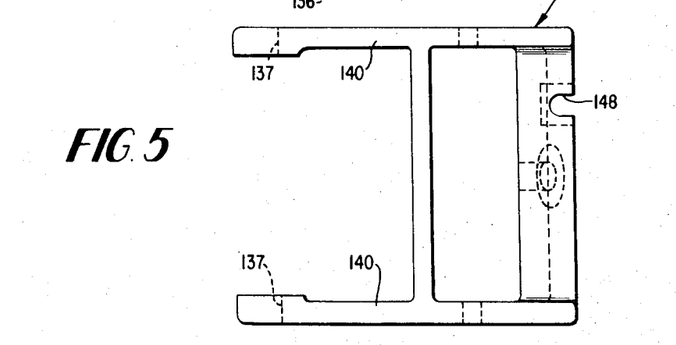
FIG. 5 is a top plan view of a modified speed control lever means provided to replace the speed control lever means of FIGS. 1 through 4 when the driven varispeed pulley is directly connected to the spindle drive shaft in drill presses omitting the jackshaft and speed reduction pulley drive mechanism of FIGS. 1 to 4.

It will be appreciated from a comparison of FIGS. 2 and 7 that the shifter mechanism 102 of FIG. 7 and shifter ring 109 are identical to that of the preferred embodiment except that the shifter lever arms 140a are shortened somewhat as compared to arms 140 of the preferred embodiment to reduce the lever arm length between pivot 112 and the slot 117 and the slot passage 148 for limit stop bolt 143a is formed in the end crosspiece of the lever rather than in a flange 149. This will be clear from an inspection of FIG. 5 where the same reference numerals are applied to the corresponding parts.

The operation of the control mechanism of this alternate embodiment is the same as previously described, it, of course, being apparent that a speed dial scale covering a different speed range will be provided for cooperation with operating knob 121 and its pointer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a power tool of the type comprising a work supporting table, a main support column fixedly related to said work support table and extending upwardly at one end of said work support table, a head structure adjustably secured to the support column for sliding movement therealong toward and away from said work support table and mounting at its opposite ends a drive motor having an output drive shaft and a dependent tool spindle drive assembly, for driving the tool spindle assembly from said drive motor: a tool spindle assembly including a driven spindle journalled in said head structure with its rotational axis generally paralleling the longitudinal axis of said support column, said tool spindle assembly including a tubular, internally splined shaft, a tool drive spindle spline connected to said tubular shaft with its lower end depending therefrom and supported by spaced bearings carried by a reciprocable quill having rack teeth extending laterally thereof throughout a major portion of its length below an undercut relief notch of a length sufficient to freely pass the teeth of a cooperating drive pinion and terminating at the quill upper end in a retainer lug, and a quill reciprocating drive pinion drive connected to a return spring biasing said quill to its uppermost position and journalled in said head structure in normal meshing engagement with said rack teeth, said drive pinion, when said quill is held in a predetermined lowered position, being freely disposed opposite said relief notch to permit winding of the return spring with said lug clearing the drive pinion and operatively positioned to prevent inadvertent disassociation of said quill and its supported tool drive spindle from said head structure and said tubular, internally splined shaft should the quill be released.

* * * * *

PO-1050
(5/69)

UNITED STATES PATENT OFFICE
CERTIFICATE OF CORRECTION

Patent No. 3,762,830      Dated October 2, 1973

Inventor(s) David I. Pettigrew

It is certified that error appears in the above-identified patent and that said Letters Patent are hereby corrected as shown below:

On title page, delete following Assignee:

"Rockwell Manufacturing Company"

and substitute therefor:

Rockwell International Corporation

Column 2, line 60, delete "containing" and insert "bottom".

Signed and sealed this 10th day of September 1974.

(SEAL)
Attest:

McCOY M. GIBSON, JR.       C. MARSHALL DANN
Attesting Officer      Commissioner of Patents